United States Patent
Burgess et al.

(10) Patent No.: US 10,084,699 B2
(45) Date of Patent: *Sep. 25, 2018

(54) TRANSFERRING DATA

(71) Applicant: Bridgeworks Limited, Hampshire (GB)

(72) Inventors: Paul Burgess, Hampshire (GB); David Trossell, Hampshire (GB)

(73) Assignee: Bridgeworks Limited, Hampshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/039,106

(22) PCT Filed: Nov. 28, 2014

(86) PCT No.: PCT/GB2014/053531
§ 371 (c)(1),
(2) Date: May 25, 2016

(87) PCT Pub. No.: WO2015/079246
PCT Pub. Date: Jun. 4, 2015

(65) Prior Publication Data
US 2017/0019332 A1    Jan. 19, 2017

(30) Foreign Application Priority Data
Nov. 29, 2013 (GB) .................................. 1321148.7

(51) Int. Cl.
*H04L 12/721* (2013.01)
*H04L 12/26* (2006.01)
(Continued)

(52) U.S. Cl.
CPC ............ *H04L 45/70* (2013.01); *H04L 5/0055* (2013.01); *H04L 41/0816* (2013.01);
(Continued)

(58) Field of Classification Search
CPC ... H04L 43/0888; H04L 49/357; H04L 45/70; H04L 5/0055; H04L 43/0829;
(Continued)

(56) References Cited

U.S. PATENT DOCUMENTS 6,160,915 A    12/2000  Kato et al.
6,700,902 B1    3/2004  Meyer
(Continued)

FOREIGN PATENT DOCUMENTS

CN    101352006 A    1/2009
EP    1892902 A2    2/2008
(Continued)

OTHER PUBLICATIONS

International Preliminary Report of PCT/GB2014/053531, dated May 31, 2016.
(Continued)

*Primary Examiner* — Cheikh Ndiaye
(74) *Attorney, Agent, or Firm* — Banner & Witcoff, Ltd.

(57) ABSTRACT

Apparatus has at least one processor and at least one memory having computer-readable code stored therein which when executed controls the at least one processor to perform a method comprising: maintaining plural logical connections on a communications path; transmitting data packets on different ones of the logical connections; monitoring acknowledgements received in respect of the data packets transmitted over the different ones of the logical connections; reusing a logical connection for which an acknowledgement for a transmitted data packet has been received; creating a new logical connection when there is a data packet to transmit over the path and there are no logical connections available for reuse; and destroying excess logical connections. This can result in the maintenance and use of a number of logical connections that is most appropriate (Continued)

for the link conditions and the data transmission requirements, thereby potentially maximizing transmission speed and minimizing system resource requirements. Advantageously, one excess logical connection is retained. This contributes further to minimizing system resource requirements.

18 Claims, 8 Drawing Sheets

(51) Int. Cl.
*H04L 29/06* (2006.01)
*H04L 5/00* (2006.01)
*H04L 12/803* (2013.01)
*H04W 28/14* (2009.01)
*H04L 12/24* (2006.01)
*H04L 12/807* (2013.01)
*H04L 12/863* (2013.01)
*H04L 12/931* (2013.01)
*H04L 29/08* (2006.01)

(52) U.S. Cl.
CPC ...... *H04L 43/0829* (2013.01); *H04L 43/0876* (2013.01); *H04L 43/0882* (2013.01); *H04L 43/0888* (2013.01); *H04L 43/0894* (2013.01); *H04L 47/122* (2013.01); *H04L 47/27* (2013.01); *H04L 47/626* (2013.01); *H04L 49/357* (2013.01); *H04L 67/1097* (2013.01); *H04L 69/14* (2013.01); *H04L 69/16* (2013.01); *H04L 69/22* (2013.01); *H04W 28/14* (2013.01); *H04L 69/163* (2013.01); *Y02D 50/30* (2018.01)

(58) Field of Classification Search
CPC ... H04L 43/0894; H04L 47/122; H04L 69/16; H04L 43/0876; H04L 67/1097; H04L 41/0816; H04L 47/27; H04L 47/626; H04L 69/14; H04L 69/163; H04L 12/721; H04L 12/26; H04L 29/06
See application file for complete search history.

(56) References Cited

U.S. PATENT DOCUMENTS

| | | | |
|---|---|---|---|
| 7,339,892 | B1 | 3/2008 | Engwer et al. |
| 7,543,072 | B1 | 6/2009 | Hertzog et al. |
| 7,581,012 | B2 | 8/2009 | Shiouchi et al. |
| 2003/0018792 | A1 | 1/2003 | Shiouchi et al. |
| 2003/0108063 | A1 | 6/2003 | Joseph et al. |
| 2007/0263542 | A1 | 11/2007 | Bammesreiter et al. |
| 2008/0043716 | A1* | 2/2008 | Toombs ................ H04L 45/00 370/351 |
| 2008/0291826 | A1 | 11/2008 | Licardie et al. |
| 2009/0271513 | A1 | 10/2009 | Liu et al. |
| 2009/0285098 | A1 | 11/2009 | Qi |
| 2010/0111095 | A1* | 5/2010 | Trossell ............... H04L 1/1607 370/402 |
| 2010/0284275 | A1 | 11/2010 | Martinez et al. |
| 2011/0280195 | A1 | 11/2011 | Muppalla |
| 2012/0166670 | A1 | 6/2012 | Kure et al. |
| 2012/0185846 | A1* | 7/2012 | Recio .................. G06F 9/5077 718/1 |
| 2013/0039209 | A1 | 2/2013 | Trossell et al. |
| 2013/0060906 | A1 | 3/2013 | Gan |
| 2013/0235739 | A1 | 9/2013 | Mamidwar et al. |

FOREIGN PATENT DOCUMENTS

| | | |
|---|---|---|
| EP | 2384073 A1 | 11/2011 |
| FR | 2951045 A1 | 4/2011 |
| GB | 2464793 A | 5/2010 |
| JP | 2001308915 A | 11/2001 |
| KR | 20020032730 A | 5/2002 |
| WO | 9107038 A2 | 5/1991 |
| WO | 0227991 A1 | 4/2002 |
| WO | 2005/104413 A1 | 11/2005 |
| WO | 2011/072537 A1 | 6/2011 |
| WO | 2011/101425 A1 | 8/2011 |

OTHER PUBLICATIONS

International Search Report of PCT/GB2014/053531, dated Feb. 6, 2015.
UK Search Report of GB1321148.7, dated Feb. 20, 2014.
Office Action dated Mar. 28, 2017 of Chinese Application Serial No. 201480074625.0.

* cited by examiner

TRANSFERRING DATA

FIELD

The specification relates to transferring data over a communications path.

BACKGROUND

The rate at which data can be transferred between network nodes using conventional methods can be limited by a number of factors. In order to limit network congestion and to ensure reliable transfers, a first node may be permitted to transmit only a limited amount of data before an acknowledgement message (ACK) is received from a second, receiving, node. Once an ACK message has been received by the first node, a second limited amount of data can be transmitted to the second node.

In Transmission Control Protocol/Internet Protocol (TCP/IP) systems, that limited amount of data relates to the amount of data that can be stored in a receive buffer of the second node and is referred to as a TCP/IP "receive window".

In conventional systems, the size of the TCP/IP window may be set to take account of the round-trip time between the first and second nodes and the available bandwidth. The size of the TCP/IP window can influence the efficiency of the data transfer between the first and second nodes because the first node may close the connection to the second node if the ACK message does not arrive within a predetermined period (the timeout period). Therefore, if the TCP/IP window is relatively large, the connection may be "timed out". Moreover, the amount of data may exceed the size of the receive buffer, causing error-recovery problems. However, if the TCP/IP window is relatively small, the available bandwidth might not be utilised effectively. Furthermore, the second node will be required to send a greater number of ACK messages, thereby increasing network traffic. In such a system, the data transfer rate is also determined by time required for an acknowledgement of a transmitted data packet to be received at the first node. In other words, the data transfer rate depends on the round-trip time between the first and second nodes.

The above shortcomings may be particularly significant in applications where a considerable amount of data is to be transferred. For instance, the data stored on a Storage Area Network (SAN) may be backed up at a remote storage facility, such as a remote disk library in another Storage Area Network (SAN). In order to minimise the chances of both the locally stored data and the remote stored data being lost simultaneously, the storage facility should be located at a considerable distance. In order to achieve this, the back-up data must be transmitted across a network to the remote storage facility. However, this transmission is subject to a limited data transfer rate. SANs often utilise Fibre Channel (FC) technology, which can support relatively high speed data transfer. However, the Fibre Channel Protocol (FCP) cannot normally be used over distances greater than 10 km, although a conversion to TCP/IP traffic can be employed to extend the distance limitation but is subject to the performance considerations described above.

SUMMARY

A first aspect of the specification provides a method comprising:

maintaining plural logical connections on a communications path;

transmitting data packets on different ones of the logical connections;

monitoring acknowledgements received in respect of the data packets transmitted over the different ones of the logical connections;

reusing a logical connection for which an acknowledgement for a transmitted data packet has been received;

creating a new logical connection when there is a data packet to transmit over the path and there are no logical connections available for reuse; and destroying excess logical connections.

The method may comprise identifying excess logical connections by determining that there are plural connections available for reuse.

The method may comprise destroying excess logical connections in response to receiving an acknowledgement.

The method may comprise destroying some but not all excess logical connections in one operation. This method may comprise destroying only a single excess logical connection and refraining from destroying other excess logical connections.

Alternatively, the method may comprise destroying all excess logical connections in one operation.

Destroying a logical connection may comprise sending a message to a remote device indicating that there is no more data to be transmitted.

There may a plural-to-one relationship between the plural logical connections and a port.

Creating a new logical connection may comprise establishing a Transmission Control Protocol (TCP) Stream socket between first and second devices.

A value Receive Window Size parameter for a logical connection may be independent of values for the parameter on other ones of the logical connections.

The method may be performed by a bridge.

A second aspect of the specification provides a computer program comprising machine readable instructions that when executed by computing apparatus causes it to perform any method above.

A third aspect of the specification provides apparatus comprising:

means for maintaining plural logical connections on a communications path;

means for transmitting data packets on different ones of the logical connections;

means for monitoring acknowledgements received in respect of the data packets transmitted over the different ones of the logical connections;

means for reusing a logical connection for which an acknowledgement for a transmitted data packet has been received;

means for creating a new logical connection when there is a data packet to transmit over the path and there are no logical connections available for reuse; and means for destroying excess logical connections.

The apparatus may comprise means for identifying excess logical connections by determining that there are plural connections available for reuse.

The apparatus may comprise means for destroying excess logical connections in response to receiving an acknowledgement.

The apparatus may comprise means for destroying some but not all excess logical connections in one operation.

The apparatus may comprise means for destroying only a single excess logical connection and refraining from destroying other excess logical connections.

The apparatus may comprise means for destroying all excess logical connections in one operation.

The means for destroying a logical connection may comprise means for sending a message to a remote device indicating that there is no more data to be transmitted.

There may be a plural-to-one relationship between the plural logical connections and a port.

The means for creating a new logical connection may comprise establishing a Transmission Control Protocol (TCP) Stream socket between first and second devices.

A value of a Receive Window Size parameter for a logical connection may be independent of values for the parameter on other ones of the logical connections.

The specification also provides a bridge comprising apparatus as above.

Another aspect of the specification provides apparatus, the apparatus having at least one processor and at least one memory having computer-readable code stored therein which when executed controls the at least one processor to perform a method comprising:
  maintaining plural logical connections on a communications path;
  transmitting data packets on different ones of the logical connections;
  monitoring acknowledgements received in respect of the data packets transmitted over the different ones of the logical connections;
  reusing a logical connection for which an acknowledgement for a transmitted data packet has been received;
  creating a new logical connection when there is a data packet to transmit over the path and there are no logical connections available for reuse; and
  destroying excess logical connections.

A further aspect of the specification provides a non-transitory computer-readable storage medium having stored thereon computer-readable code, which, when executed by computing apparatus, causes the computing apparatus to perform a method comprising:
  maintaining plural logical connections on a communications path;
  transmitting data packets on different ones of the logical connections;
  monitoring acknowledgements received in respect of the data packets transmitted over the different ones of the logical connections;
  reusing a logical connection for which an acknowledgement for a transmitted data packet has been received;
  creating a new logical connection when there is a data packet to transmit over the path and there are no logical connections available for reuse; and
  destroying excess logical connections.

BRIEF DESCRIPTION OF THE DRAWINGS

Embodiments of the present specification will now be described with reference to the accompanying drawings, in which.

DETAILED DESCRIPTION

In brief, embodiments of the specification relate to providing maintaining and transmitting data packets over multiple logical connections on a communications path, in which each data packet is only transmitted over one logical connection. Based on received acknowledgements, a logical connection for which an acknowledgement for a transmitted data packet has been received is reused. The logical connection can reused as soon as it becomes available, i.e. when the acknowledgement is received, as long as there is data in the transmit buffer to transmit over the logical connection. If there is a data packet to transmit over the path and there are no logical connections available for reuse, a logical connection is created. Also, excess logical connections are destroyed. This can result in the maintenance and use of a number of logical connections that is most appropriate for the link conditions and the data transmission requirements, thereby potentially maximizing transmission speed and minimizing system resource requirements. Advantageously, one excess logical connection is retained. This contributes further to minimizing system resource requirements.

Figure 1:
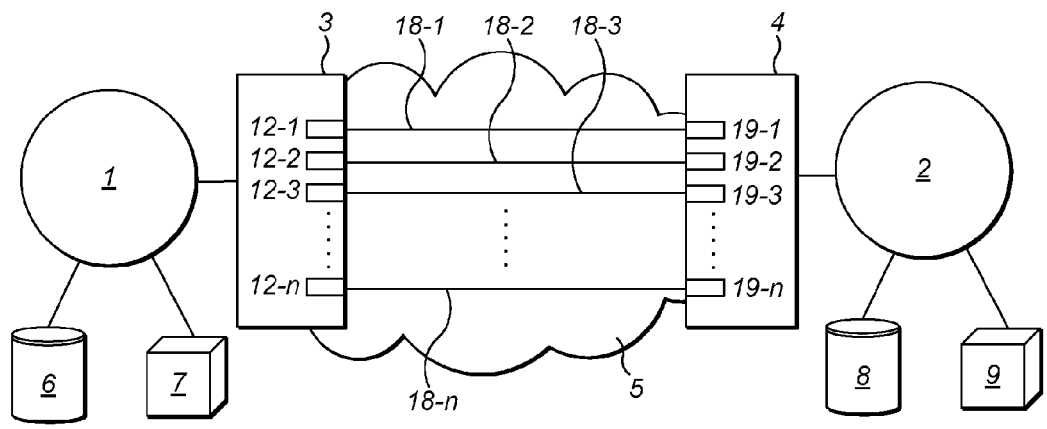
FIG. 1 depicts a system according to embodiments of the present specification.

FIG. 1 depicts a system according to embodiments of the specification. In this particular example, the system includes a local Storage Area Network (SAN) 1, and a remote SAN 2. The remote SAN 2 is arranged to store back-up data from clients, servers and/or local data storage in the local SAN 1.

Two bridges 3, 4, associated with the local SAN 1 and remote SAN 2 respectively, are connected via a path 5. The bridges 3, 4 are examples of network nodes. The path 5 provides a number of physical paths between the bridges 3, 4. In this particular example, the path 5 is a path over an IP network and the bridges 3 and 4 can communicate with each other using the Transmission Control Protocol (TCP). The communication paths between the bridges 3, 4 may include any number of intermediary routers and/or other network elements. Other devices 6, 7 within the local SAN 1 can communicate with devices 8 and 9 in the remote SAN 2 using the bridging system formed by the bridges 3, 4 and the path 5.

Figure 2:
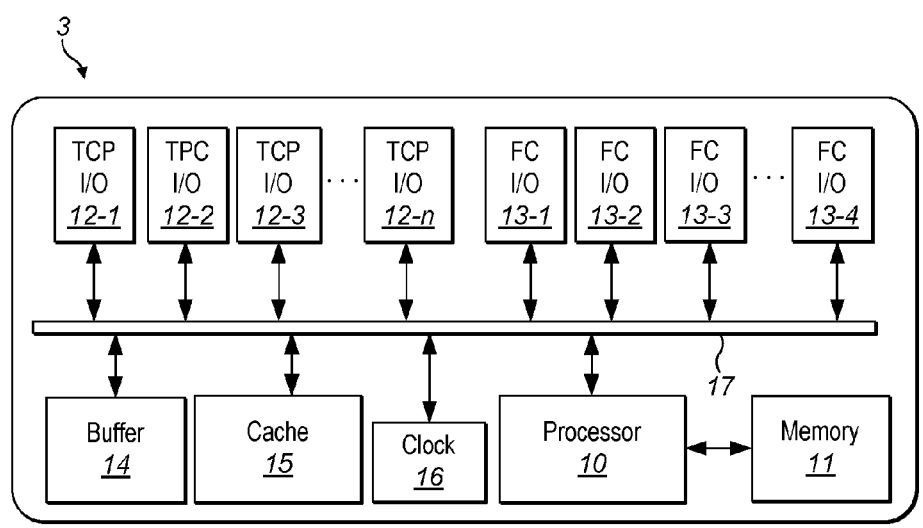
FIG. 2 depicts a node in the system of FIG. 1.

FIG. 2 is a block diagram of the local bridge 3. The bridge 3 comprises a processor 10, which controls the operation of the bridge 3 in accordance with software stored within a memory 11, including the generation of processes for establishing and releasing connections to other bridges 4 and between the bridge 3 and other devices 6, 7 within its associated SAN 1.

The connections between the bridges 3, 4 utilise I/O ports 12-1~12-n, which are physical ports over which the TCP protocol is transmitted and received. A plurality of Fibre Channel (FC) ports 13-1~13-n may also be provided for communicating with the SAN 1. The FC ports 13-1~13-n operate independently of, and are of a different type and specification to, ports 12-1~12-n. The bridge 3 can transmit and receive data over multiple connections simultaneously using the ports 12-1~12-n and the FC Ports 13-1~13-n.

A plurality of buffers 14 are provided for storing data for transmission by the bridge 3. A plurality of caches 15 together provide large capacity storage while a clock 16 is arranged to provide timing functions. The processor 10 can communicate with various other components of the bridge 3 via a bus 17.

Figure 3:
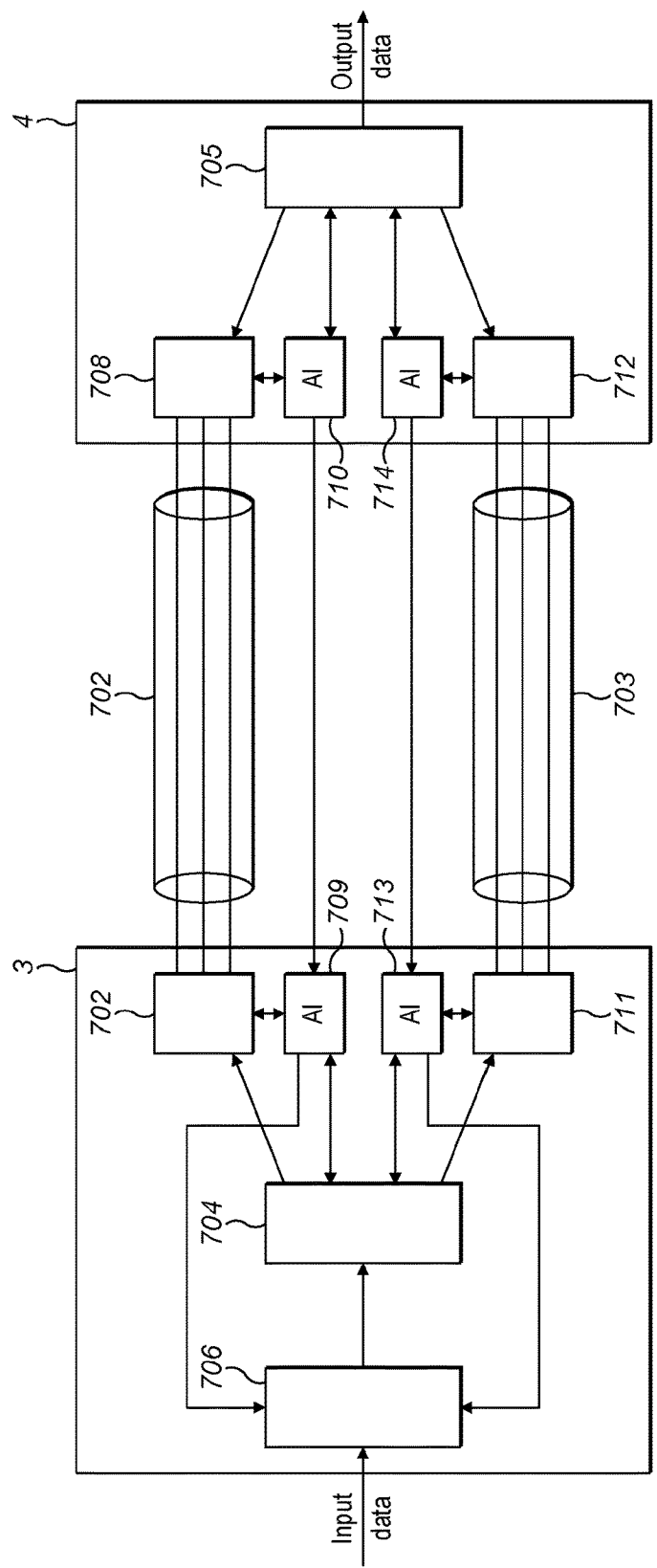
FIG. 3 is a schematic diagram illustrating a system according to embodiments of the present specification, and is an alternative to the system of FIG. 1.

FIG. 3 is a schematic diagram illustrating a system according to embodiments of the specification in which the two bridges 3, 4, associated with the local SAN 1 and remote SAN 2 respectively, are connected via first and second paths 702, 703. Other features from the FIG. 1 system are present in the FIG. 3 system but are omitted from the Figure for improved clarity. These features include the plurality of I/O ports 12-1~12-n, the Fibre Channel (FC) ports 13-1~13-n etc.

The memory 11 stores software (computer program instructions) that, when loaded into the processor 10, control the operation of the local bridge 3. The software includes an operating system and other software, for instance firmware and/or application software.

The computer program instructions provide the logic and routines that enables the local bridge 3 to perform the functionality described below. The computer program instructions may be pre-programmed into the local bridge 3. Alternatively, they may arrive at the local bridge 3 via an electromagnetic carrier signal or be copied from a physical entity such as a computer program product, a non-volatile electronic memory device (e.g. flash memory) or a record medium such as a CD-ROM or DVD. They may for instance be downloaded to the local bridge 3, e.g. from a server.

The processor 10 may be any type of processor with processing circuitry. For example, the processor 10 may be a programmable processor that interprets computer program instructions and processes data. The processor 10 may include plural processors. Each processor may have one or more processing cores. The processor 10 may comprise a single processor that has multiple cores. Alternatively, the processor 10 may be, for example, programmable hardware with embedded firmware. The processor 10 may be termed processing means.

The remote bridge 4 is configured similarly to the local bridge 3, and FIG. 2 and the above description applies also to the remote bridge 4.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

The local bridge 3 and the remote bridge 4 as shown in FIG. 3 include a number of interconnected components. The bridges 3, 4, which will now be described with reference to FIG. 3, which allows operation of the bridges and their interworking to be explained.

Input data is received and stored in memory under control of a data cache 706 in the local bridge 3. One data cache 706 is provided for each storage device 8, 9 that is connected to the remote bridge 4. To simplify the following description, the operation of a single data cache 706 will be described. The input data is received as discreet data segments. The data segments in the input data are in the form in which they were received on the host interface (e.g. the FC interface 13), although with the protocol removed/stripped. The data segments are data that is required to be communicated to the remote bridge 4. The data segments may be packets of data, but they should not be confused with the transfer packets that are discussed in this specification. The data segments include headers that contain a description of the data, its source and destination, size and memory vectors.

An output of the data cache 706 is connected to an input of a dispatcher 704. As such, input data is provided to the dispatcher 704 by the data cache 706. The dispatcher is an example of a data handling module.

The input data is stored in memory in the local bridge 3 and is managed by the data cache 706. The data cache 706 manages the storage etc. of commands and data that pass in both directions, that is from the SAN 1 to the SAN 2 and vice versa. The cache 706 manages protocol interaction with the SANs 1, 2 or other hosts. Examples of actions performed by the cache 706 include receiving write commands, opening channels to allow a host to write data, etc.

From the dispatcher 704, the input data may be provided either to a first path transmitter interface 707 or a second path transmitter interface 711.

The first path transmitter interface 707 is connected via the path 702 to a first path receiver interface 708 in the receiver. Similarly, the second path transmitter interface 711 is connected by the second path 703 to a second path receiver interface 712 in the remote bridge 4.

Each of the paths 702, 703 includes multiple logical connections. Each of the paths 702, 703 has one or more physical ports. These ports and logical connections may be provided as described below with reference to FIG. 4. Alternatively, they may be provided as described below with reference to FIG. 6. In either case, the number of logical connections is selected so as to provide suitable performance of data transfer over the respective path, 702, 703. In the case of the method of FIG. 6, the number of logical connections is managed so as to optimise performance.

The ports 12-1~12-n shown in the bridge 3 of FIG. 1 are included in the first transmitter interface 707 of FIG. 3, but are omitted from the Figure for clarity. Similarly, ports 12-1~12-n are provided within the second transmitter interface 711. Corresponding ports 19-1~19-n are provided in the first and second path receiver interfaces 708, 712 of the remote bridge 4.

A first path transmitter artificial interface (AI) module 709 is provided in the local bridge 3. The first path transmitter AI module 709 is coupled in a bi-directional manner to both the first path transmitter interface 707 and the dispatcher 704. Additionally, it is connected to receive signalling from a first path receiver AI module 710, that is located in the remote bridge 4. The first path receiver AI module 710 is coupled in a bi-directional manner both to the first path receiver interface 708 and to the output cache 705.

Similarly, a second path transmitter AI module 713 is located in the local bridge 3, and is connected in a bi-directional manner both to the second path transmitter interface 711 and to the dispatcher 704. A second path receiver AI module 714 is located in the remote bridge 4, and is bi-directionally coupled both to the output cache 705 and to the second path receiver interface 712. The second path AI module 713 is connected to receive signalling from the second path receiver AI module 714.

The dispatcher 704 is configured to determine which of the first path transmitter interface 707 and the second path transmitter interface 711 is to be provided with data segments for transmission over its respective path 702, 703. Operation of the dispatcher 704 is described in detail below.

In the remote bridge 4, a combiner/cache 705 is provided. The combiner/cache 705 provides the function of a cache and the function of a combiner. Alternatively, separate modules may be included in the remote bridge 4 such as to provide these functions. Output data is stored in memory in the receiver 702 and is managed by the cache/combiner 705.

The combiner/cache 705 causes the combining of data that is received over the first and second paths 702, 703 within the output cache 705. The data is combined by the combiner 705 such that the output data that results from the cache 705 comprises data segments in the correct order, that is it is in the order in which the at a segments were received as input data at the local bridge 3. The combination of data within the output cache 705 is performed by the combiner 705 based on the examination of headers.

Figure 4:
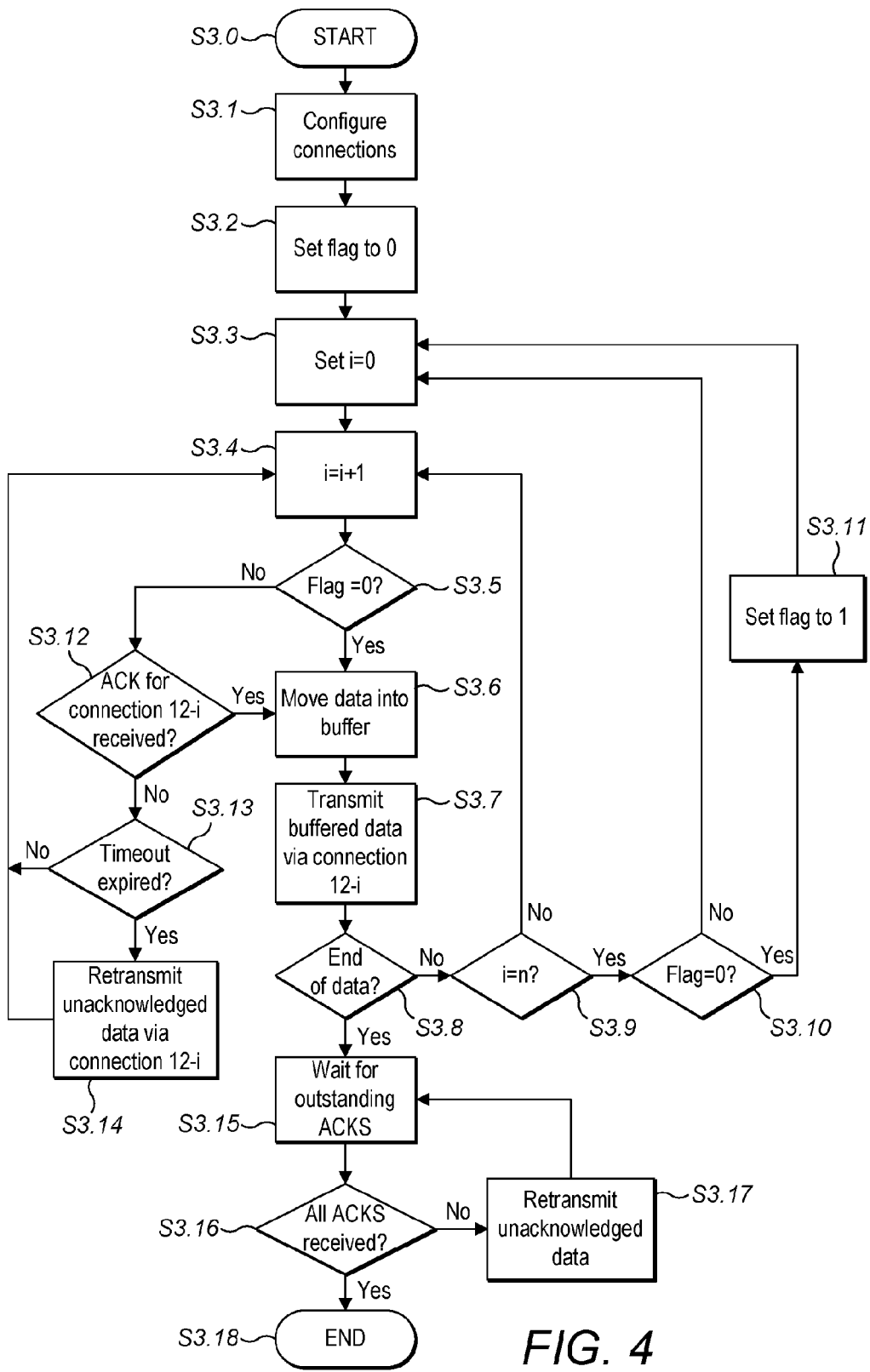
FIG. 4 is a flowchart illustrating a method of transmitting data between a transmitter and a receiver.
Figure 5:
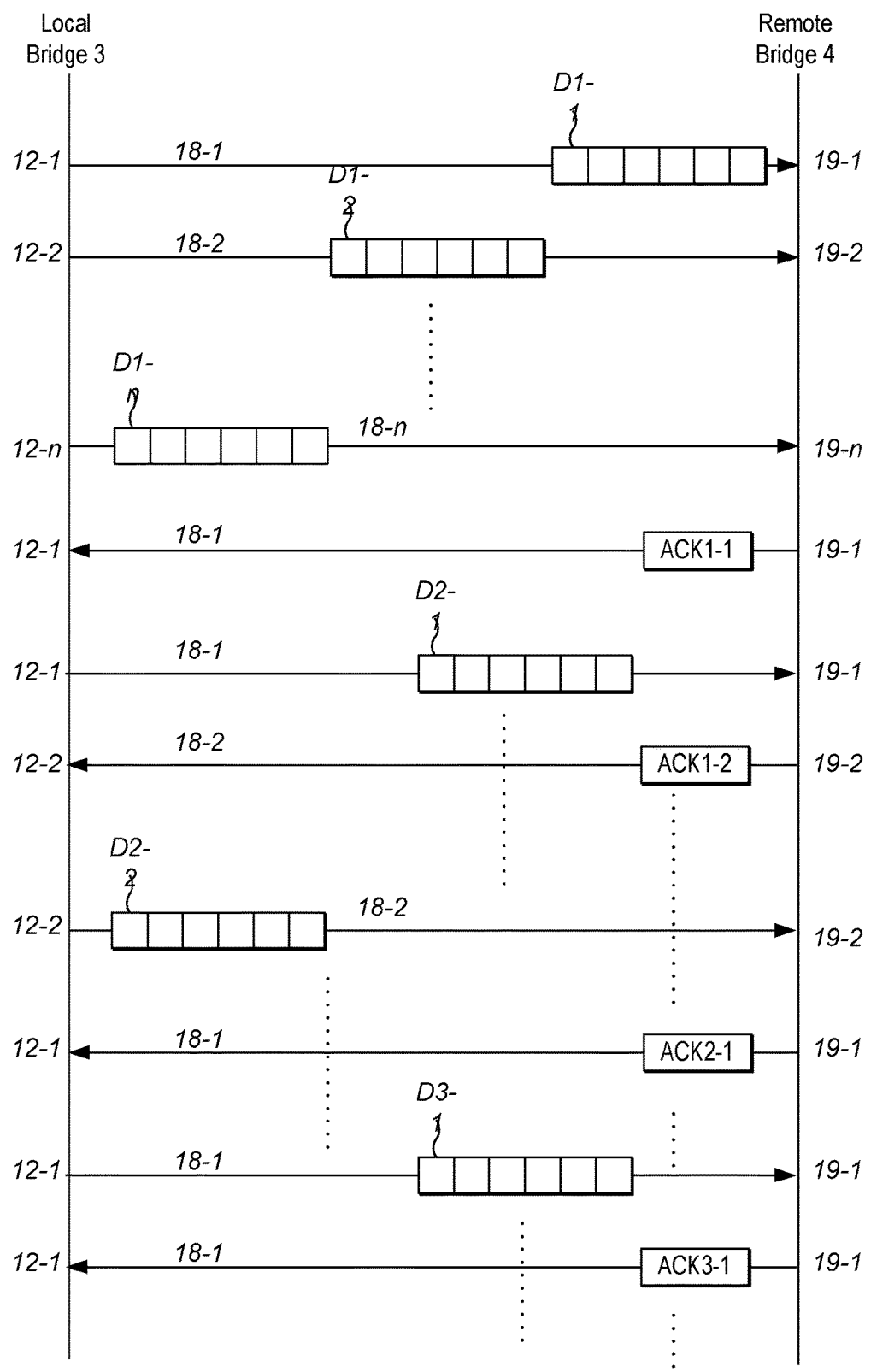
FIG. 5 depicts data transfer in the system of FIG. 1 or FIG. 3.

Referring to FIGS. 1 and 4, in order to transfer data, multiple logical connections 18-1~18-n are established between ports 12-1~12-n of the bridge 3 and corresponding ports 19-1~19-n of the remote bridge 4. In this manner, a first batch of data segments D1-1 can be transmitted from a first one of said ports 12 via a logical connection 18-1. Instead of delaying any further transmission until an acknowledgement ACK1-1 for the first batch of data segments to be received, further batches of data segments D1-2 to D1-n are transmitted using the other logical connections 18-b~18-n. Once the acknowledgement ACK1-1 has been received, a new batch of data segments D2-1 is sent to the remote bridge 4 via the first logical connection 18-1, starting a repeat of the sequence of transmissions from logical connections 18-1~18-n. Each remaining logical connection transmits a new batch of data segments D2-2 once an acknowledgement for the previous batch of data segments D1-2 sent via the corresponding logical connection 18-1~18-n is received. In this manner, the rate at which data is transferred need not be limited by the round trip time between the bridges 3, 4. When multiple ports 12 are used to transmit data between bridges 3, 4, a number of logical connections 18 are associated with each port. As is explained below, the number of logical connections provided with a given port 12 depends on the physical path capability and the round trip time for that path 5.

A batch of data segments in this context constitutes a transfer packet. Data segments do not have headers since they have been stripped of protocol when they arrived at the bridge 3. A transfer packet has an associated header, and the creation and handling of transfer packets is discussed in detail later in this specification.

Plural network payload packets are created from the data segments, as is described in more detail below. In brief, a transfer packet includes one data segment, plural data segments, or part of a data segment. A network payload packet includes one or more transfer packets. Each transfer packet is provided with a header specifically relating to the transfer packet. A network payload packet is not provided with a header, although each network payload packet includes at least one transfer packet header. When a network payload packet is sent over a path, it typically is provided with a header by the protocol used for that path. For instance, a network payload packet sent over a TCP path is provided with a TCP header by the protocol handler.

A method of transmitting data from the bridge 3 to the remote bridge 4, used in embodiments of the specification, will now be described with reference to FIGS. 1, 3 and 4.

Starting at step S3.0, the bridge 3 configures N logical connections 18-1~18-n between its ports 12-1~12-n and corresponding ports 19-1~19-n of the remote bridge 4 (step S3.1). Each port 12 has one or more logical connections 18 associated with it, i.e. each port 12 contributes in providing one or more logical connections 18.

Where the bridge 3 is transferring data from the SAN 1, it may start to request data from other local servers, clients and/or storage facilities 6, 7, which may be stored in the cache 15. Such caches 15 and techniques for improving data transmission speed in SANs are described in US 2007/0174470 A1, the contents of which are incorporated herein by reference. Such a data retrieval process may continue during the following procedure.

As described above, the procedure for transmitting the data to the remote bridge 4 includes a number of transmission cycles using the logical connections 18-1-18-n in sequence. A flag is set to zero (step S3.2), to indicate that the following cycle is the first cycle within the procedure.

A variable i, which identifies a logical connection used to transmit network payload packets, is set to 1 (steps 3.3, 3.4).

As the procedure has not yet completed its first cycle (step S3.5), the bridge 3 does not need to check for acknowledgements of previously transmitted data. Therefore, the processor 10 transfers a first batch of data segments D1-1 to be transmitted into the buffer 14 (step S3.6). The first batch of packets together constitute a network payload packet. The size of the network payload packet is selected so as to maximise efficiency of the data transfer, as is described below. The buffered data segments D1-1 are then transmitted as a network payload packet via logical connections 18-i which, in this example, is logical connection 18-1 (step S3.7).

As there remains data to be transmitted (step S3.8) and not all the logical connections 18-1~18-n have been utilised in this cycle (step S3.9), i is incremented (step S3.4), in order to identify the next logical connection and steps S3.5-S3.9 are performed to transmit a second batch of data segments D1-2 (a second network payload packet) using logical connection 12-i, i.e. logical connection 18-2. Steps S3.4-S3.9 are repeated until a respective batch of data segments D1-1 to D1-n (a network payload packet) has been sent to the remote bridge 4 using each of the logical connections 8-1~18-n.

As the first cycle has now been completed (step S3.10), the flag is set to 1 (step S3.11), so that subsequent data transmissions are made according to whether or not previously network payload packets have been acknowledged.

Subsequent cycles begin by resetting i to 1 (steps S3.3, S3.4). Beginning with port 18-1, it is determined whether or not an ACK message ACK1-1 for the network payload packet D1-1 most recently transmitted from port 12-1 has been received (step S3.12). If an ACK message has been received (step S3.12), a new network payload packet D2-1 is moved into the buffer 14 (step S3.6) and transmitted (step S3.7). If the ACK message has not been received, it is determined whether the timeout period for logical connection 18-1 has expired (step S3.13). If the timeout period has expired (step S3.13), the unacknowledged data is retrieved and retransmitted via logical connection 18-1 (step S3.14).

If an ACK message has not been received (step S3.12) but the timeout period has not yet expired (step S3.14), no further data is transmitted from logical connection 18-1 during this cycle. This allows the transmission to proceed without waiting for the ACK message for that particular logical connection 18-1 and checks for the outstanding ACK message are made during subsequent cycles (step S3.12) until either an ACK is received network payload packet D2-1 is transmitted using logical connection 18-1 (steps S3.6, S3.7) or the timeout period expires (step S3.13) and the network payload packet D1-1 is retransmitted (step S3.14).

The procedure then moves on to the next logical connection 18-2, repeating steps S3.4, S3.5, S3.12 and S3.7 to S3.9 or steps S3.4, S3.5, S3.12, S3.13 and S3.14 as necessary.

Once data has been newly transmitted using all N logical connections (step S3.9, S3.10), i is reset (steps S3.3, S3.4) and a new cycle begins.

Once all the data has been transmitted (step S3.8), the processor 10 waits for the reception of outstanding ACK messages (step S3.15). If any ACKs are not received after a predetermined period of time (step S3.16), the unacknowledged data is retrieved from the cache 15 or the relevant element 6, 7 of the SAN 1 and retransmitted (step S3.17). The predetermined period of time may be equal to, or greater than, the timeout period for the logical connections 18-1~18-n, in order to ensure that there is sufficient time for any outstanding ACK messages to be received.

When all of the transmitted data, or an acceptable percentage thereof, has been acknowledged (step S3.16), the procedure ends (step S3.18).

In the method of FIG. 3, the number N of connections is greater than 1, and the number of connections is fixed. The use of plural connections results in improved performance of data transmission, compared to a corresponding system in which only one connection is used, but utilises more system resources than such a corresponding system.

An alternative method of transmitting data will now be described with reference to FIG. 6. This method involves optimising the number of logical connections used to transfer data over the path 5, 702, 703.

Here, the operation starts at step S1.

At step S2, values of x and n are initialised to zero. A count of the network payload packets that are transmitted is indicated by n. A count of the acknowledgements that have been received is indicated by x.

At step S3, data is moved to the transmit buffer 14, which is shown in FIG. 2, ready for transmission.

At step S4, it is determined whether a logical connection 18 is available. This determination is carried out by examining each of the logical connections 18 that have previously been created and determining for which of those logical connections 18 an acknowledgement has been received for the network payload packet last transmitted over that logical connection. A logical connection 18 is available if an acknowledgment of the last transmitted network payload packet has been received.

As will be appreciated from the above description with reference to FIGS. 1 and 4, there is a plural-to-one relationship between logical connections 18 and ports 12. In TCP embodiments, an available logical connection 18 is an established TCP connection between bridges 3, 4 that is not processing data for transmission and has no outstanding acknowledgments.

If no logical connections 18 are available, a new logical connection 18 is created at step S5 by establishing a TCP Stream socket between the bridges 3, 4. If a logical connection 18 was determined to be available at step S4 or after the creation of a new logical connection 18 at step S5, network transfer packet n is transmitted on the logical connection 18 at step S6. Here, the logical connection 18 is one for which there is no outstanding acknowledgement. For a new logical connection 18, no network transfer packets will have been sent over the logical connection 18 previously. For an existing logical connection 18, a network transfer packet been sent previously but an acknowledgment has been received for the transmitted network transfer packet.

Following step S6, n is incremented at step S7. Following step S7, it is determined at step S8 whether the data moved to the buffer in step S3 constitutes the end of the data to be transmitted. If there are no more network transfer packets to be transmitted, step S8 results in a positive determination. If there is at least one more network transfer packet to be transmitted, step S8 provides a negative determination, and the operation proceeds to step S9.

At step S9, it is determined whether an acknowledgement for the network transfer packets x has been received from the remote bridge 4.

If it is determined that an acknowledgment for network transfer packet x has not been received, at step S10 it is determined whether a timeout for the data has expired. The value of the timer used in the timeout determination at step S10 may take any suitable value. For a high latency path between the bridges 3 and 4, the value of the timeout may be relatively high. If the timeout has expired, the network transfer packet from the buffer x is retransmitted at step S11.

If it is determined at step S9 that an acknowledgement for the network transfer packet x has been received, the value of x is incremented at step S12. Following step S12, excess logical connections 18 are destroyed at step S12. To determine excess logical connections, each is first verified to ensure that no data transmissions are in progress and no acknowledgements are outstanding. Excess logical connections are destroyed in a controlled manner. This occurs by the sending of a FIN message from the bridge 3 to the remote bridge 4, which responds by sending an ACK message to the bridge 3 acknowledging the FIN message. The FIN message is in respect of the excess logical connection. The FIN message indicates that there is no more data to be transmitted from the sender. Receipt of the ACK message at the local bridge 3 completes the operation.

In the case of the first path 702, the first path transmitter interface 707 is responsible for the creation and destruction of logical connections, and is configured to so create and destroy. In association with the second path 703, the second path transmitter interface 711 is responsible for, and is configured to perform, the creation and destruction of logical connections. Of course, the first and second path receiver interfaces 708, 712 are active in the creation and destruction of logical connections, although initiation is performed by the first and second path transmitter interfaces 707, 711.

Following step S12 or step S11, or following a determination at step S10 that the time out has not expired, the operation returns to step S3. Here, at least one more network payload packet is moved to the buffer for transmission.

It will be understood from the above that, whilst there is more data (in the form of network payload packets) to be transmitted, the number of logical connections 18 is managed such that the correct number of logical connections 18 are available to send the data. However, this is achieved without maintaining an unnecessarily high number of logical connections 18. In particular, it is checked regularly whether there are excess logical connections 18 and any excess connections detected are then destroyed. In particular, the check for excess connections is made in this example every time that an acknowledgement is noted at step S9 to have been received. Instead of destroying all the excess connections in one operation, any excess connections detected may be removed one at a time. That is, one excess connection may be removed each time the operation performs the step S13. This can result in a number of (one or more) spare logical connections being held in reserve for use should the transmitter 707, 711 require them in response to a change in the conditions of the path 5, 702, 703. Because the time and compute resource required to create a logical connection is greater than to destroy a logical connection, destroying the excess logical connections one at a time may utilise fewer system resources.

However, for a path 5, 702, 703 that is in a relatively steady condition and where data flow into the local bridge 3 is relatively steady, the number of logical connections that are in existence changes relatively infrequently. If the path 5, 702, 703 remains stable, then the number of logical connections decreases to the optimum level whichever of the options for destroying excess logical connections is used.

Figure 6:
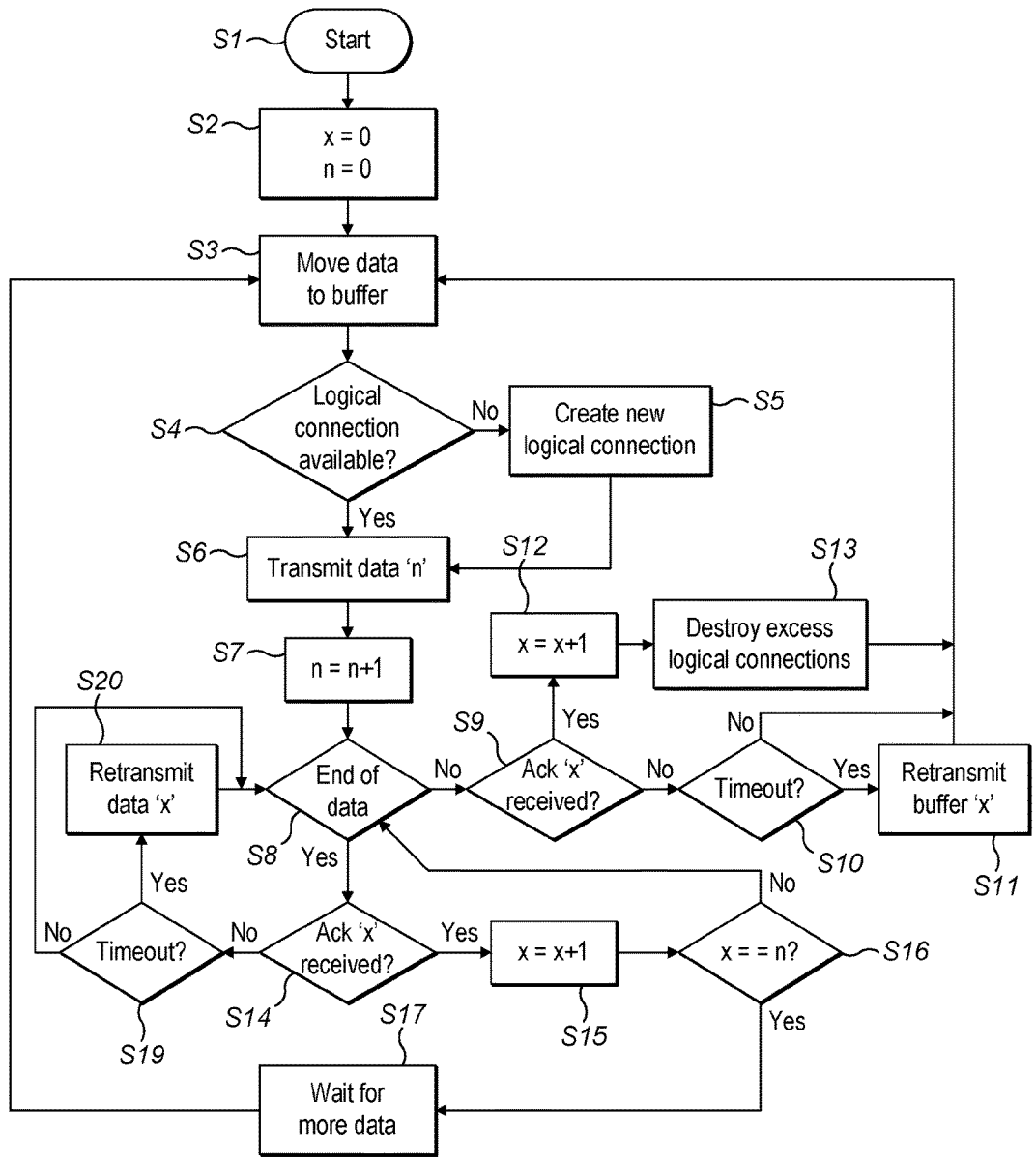
FIG. 6 is a flowchart illustrating a method of transmitting data between a transmitter and a receiver according to embodiments of the present specification, and is an alternative to the method of FIG. 4.

A consequence of the so far described aspects of the operation of FIG. 6 is that the number of logical connections 18 that are in existence at any given time is optimal or near optimal for the path 5. In particular, the number of logical connections 18 is sufficiently high to allow transmission of all of the data that needs to be transmitted but is no higher than is needed for this, or at least excess logical connections 18 are destroyed frequently so as to avoid the number of logical connections 18 being higher than needed for a significant proportion of overall time. This provides optimal performance for the transfer of data over the path 5, 702, 703 but without wasting memory etc. resources on logical connections that are not needed.

When all of the data from the buffer 14 has been transmitted (i.e. when all of the network transfer packets have been transmitted), whether or not it has all been acknowledged, step S8 produces a positive result. In this event, the operation proceeds to step S14, where it is determined whether an acknowledgement for network transfer packet x has been received. If it is determined that an acknowledgment for network transfer packet x has been received, the value of x is incremented at step S15. Next, at step S16 it is determined whether the value of x is equal to the value of n. Because x is a count of acknowledgements and n is a count of network payload packets, this amounts to an assessment as to whether acknowledgements for all of the transmitted network transfer packets have been received. On a negative determination, indicating that not all acknowledgements have been received, the operation returns to step S8, where it is again determined whether it is the end of the data in the buffer. Upon reaching step S8 from step S16 without any more data having been received at the buffer, the operation proceeds again to step S14. The loop of steps S8, S14, S15 and S16 causes the operation to monitor for acknowledgment of transmitted network transfer packets without sending more data.

If at step S14 it is determined that an acknowledgement for network transfer packet x has not been received, it is determined at step S19 whether a timeout for the network transfer packet x has occurred. If a timeout has not occurred, the operation returns to step S8. If a timeout has occurred, the network transfer packet x is retransmitted at step S20.

The retransmission steps S11 and S20 ensure that network transfer packets for which an acknowledgement has not been received are retransmitted. Moreover, they are continued to be retransmitted until receipt of the network transfer packets has been acknowledged by the remote bridge 14.

Once step S16 determines that all acknowledgements have been received, the operation proceeds to step S17. Here, the bridge 3 waits for more data to be received. Once it is received, the operation proceeds to step S3, where the data is moved to the buffer 14 for transmission.

Operation of the dispatcher 704 in the system of FIG. 3, which includes two paths 702, 703, will now be described with reference to FIG. 7.

The operation starts at step S1. At step S2, it is determined by the dispatcher 704 whether there is data in the buffer and indicated by the cache 706 as being required to be transmitted. On a negative determination, at step S3 the dispatcher 706 waits for data to be added to the cache 706. Once data for transmission is determined to be in the input buffer under management of the cache 706, the operation progresses to step S4.

At step S4, the dispatcher 704 detects the one of the paths 702, 703 that has the greatest need for data. This can be achieved in any suitable way.

For instance, the dispatcher 704 may use information supplied by the first and second path transmit AI modules 709 and 713 to determine the path that has the greatest need for data. In particular, the dispatcher 704 may determine based on information supplied by the first and second path AI transmitter modules 709, 713 which of the paths 702 and 703 has the greatest need for data. This requires the AI modules 709, 713 to be configured to calculate and provide relevant information.

In providing information to assist the dispatcher 704 to determine which of the paths 702, 703 has the greatest need for data, the AI transmitter modules 709, 713 perform a number of calculations. In particular, the AI transmitter modules 709, 713 calculate some transmission parameters including packet loss, latency and speed (in terms of bytes per second). Packet loss is calculated by counting network payload packets for which acknowledgements were not received (within a timeout window) within a given time period, and calculating the ratio of lost network payload packets to successfully transmitted network payload packets. The latency is calculated by calculating the average time between a network payload packet being transmitted and the acknowledgement for that network payload packet being received, using timing information provided by the transmit interfaces 707, 711. Speed of the physical path 5, 702,703 is determined by determining the quantity of data that is successfully transmitted in a time window, of for instance 1 second. Times for which there was no data (no network payload packets) to transmit may be excluded from the path speed calculation, so the measured path speed relates only to times when data was being transmitted.

On the basis of these measured parameters, the AI transmitter modules 709, 713 calculate, for their respective path 702, 703, a number of bytes that are required to be put onto the path per unit time (e.g. per second). This is calculated by multiplying the bandwidth in MB/s of the physical path by the current latency value in seconds At a particular moment in time, the AI transmitter modules 709, 713 are able to determine the quantity of data (in bytes) that has been sent but for which acknowledgements have not yet been received. This data can be termed data that is in flight. Data that is in flight must remain in the transmit buffer, as managed by the logical connection, but once an acknowledgement for the data is received then the corresponding memory for the transmit buffer can be reallocated.

Either the AI transmitter modules 709, 713 can report quantity of data in flight to the dispatcher 704 at predetermined times our statuses such as the last byte of data of the data segment has been transmitted, or else the dispatcher 704 can request that the AI transmitter modules 709, 713 provide quantity of data in flight information. In either case, the dispatcher 704 is provided with quantity of data in flight information from the AI transmitter modules 709, 713 at times when this information is needed by the dispatcher in order to make an assessment as to which path 702, 703 has the greatest need for data. The same applies to path speed information, as calculated by the AI transmitter modules 709, 713.

For each path, the dispatcher 704 calculates a path satisfaction value. For instance, this can be calculated by dividing the amount of data in flight (e.g. in bytes) by the path speed. Where the latency of the path is less than 1 second and where the path speed measurement has a unit of bytes per second, the path satisfaction value for a path has a value between 0 and 100. A low value indicates that the path is not highly satisfied, and has a relatively high need for data. A high value indicates that the path is relatively highly satisfied, and has a relatively low need for data.

The identification of the path with the greatest need for data is made using the path satisfaction values for the paths. This may involve simply identifying which path has the lowest path satisfaction value, and selecting that path as the path with the greatest need for data. Alternatively, the identification of the path with the greatest need for data may additionally utilise other information such as path speed or latency measured for the path 702, 703.

Once a path 702, 703 has been determined at step S4, the dispatcher 704 begins preparing to provide the transmit interface 707, 711 for the path 702, 703 with data from the data cache 706. This starts at step S5, where the value of the OTPS parameter for the path 702, 703 is fetched. The value of the parameter is fetched from the corresponding path's AI transmitter module 709, 713. The value of the OTPS parameter is calculated by the AI transmitter module 709, 713 in the manner described below with reference to FIG. 11. Since the value of the OTPS parameter is calculated separately for each of the paths 702, 703, there may be a different OTPS parameter for each of the paths 702, 703.

At step S6, the dispatcher 704 selects a first part of the next data segment in the cache 706.

The part of the data segment that is selected has a length equal to the fetched value of the OPTS parameter. Where the data segment has a length that is less than or equal to the value of the OPTS parameter, the whole of the data segment is selected. Where the data segment has a length that is greater than the value of the OPTS parameter, a part of the data segment of length equal to the value of the OPTS parameter is selected.

Once a quantity of data from the dispatcher 704 has been selected for provision to the path, an IO vector for the selected data is created by the dispatcher 704, for use by the transmit interface 707, 711 of the selected path. The creation of the IO vector constitutes the provision of a transfer packet. The creation of the IO vector and thus the transfer packet is described in more detail below with reference to FIGS. 8 and 9. Briefly, the conversion of the IO vector results in an IO vector that points to a transfer packet having at maximum the same size as the size indicated by the OTPS parameter for the path which was fetched at step S5. The IO vector is later provided to the FIFO buffer (not shown) associated with the relevant path 702, 703.

After the IO vector creation at step S6, the IO vector is transferred to the selected path 702, 703, and in particular to a FIFO buffer (not shown) of the transmit interface 707, 711 of that path, at step S7. The result of step S7 is the provision, to the FIFO buffer (not shown) forming part of the transmit interface 707, 711 of the path that was detected at step S4 to have the greatest need for data, of an IO vector comprising a pointer to a transfer packet and indicating the length of the transfer packet. Moreover, the FIFO buffer of the path 702, 703 is provided with an IO vector that relates to a transfer packet having the optimum transfer packet size, or possibly a smaller size. This allows the path 702, 703, and in particular the relevant transmit interface 707, 711, to access the (whole or part of) the data segment. This is provided with the (whole or part of the) data segment in a transfer packet having at maximum the optimum transfer packet size that has been determined for the selected path, for transmission over a logical connection of the selected path 702, 703.

At step S8, it is determined whether the end of the data segment has been reached. On a positive determination, the operation returns to steps S2, where the next data segment can be retrieved and processed. On a negative determination, the operation returns to step S4. Here, the steps S4 to S7 are performed again for the next part of the data segment.

If step S4 identifies that the same path 702, 703 still has the greatest need for data, an IO vector (and transfer packet) is created for the next part of the segment with a length equal to (or possibly less than) the value of the OTPS value for that path 702, 703. The value of 3o OTPS does not normally change between successive transfer packets for the same path 702, 703, although this does occur occasionally.

If step S4 identifies that the opposite path 702, 703 now has the greatest need for data, an IO vector (and transfer packet) is created for the next part of the segment with a length equal to (or possibly less than) the value of the OTPS value for that opposite path 702, 703. The size of this next transfer packet is dependent on the value of a different OPTS parameter (the OPTS parameter for the opposite path) so often is different to the size of the previous transfer packet.

For a data segment that is longer than the value of the OPTS parameter that is fetched at step S5 when the data segment is first processed, the transmission of the data segment may occur over two different paths 702, 703. It is not that the data segment is transmitted over both paths. Instead, different parts of the data segment are transmitted over different paths 702, 703.

Figure 8:
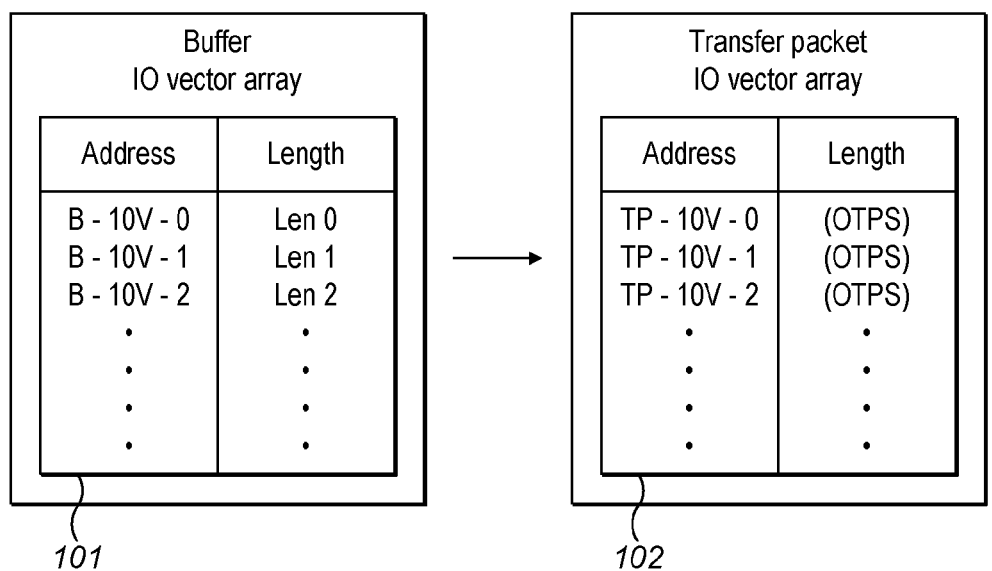
FIG. 8 is a diagram illustrating IO vector arrays before and after the performance of the operation of FIG. 7.

Referring now to FIG. 8, an IO vector array 101 for the buffer is shown on the left side of the Figure and an IO vector array 102 for the transfer packets is shown on the right side of the Figure.

The IO vector array 101 of the buffer is managed by the dispatcher 704.

Figure 9:
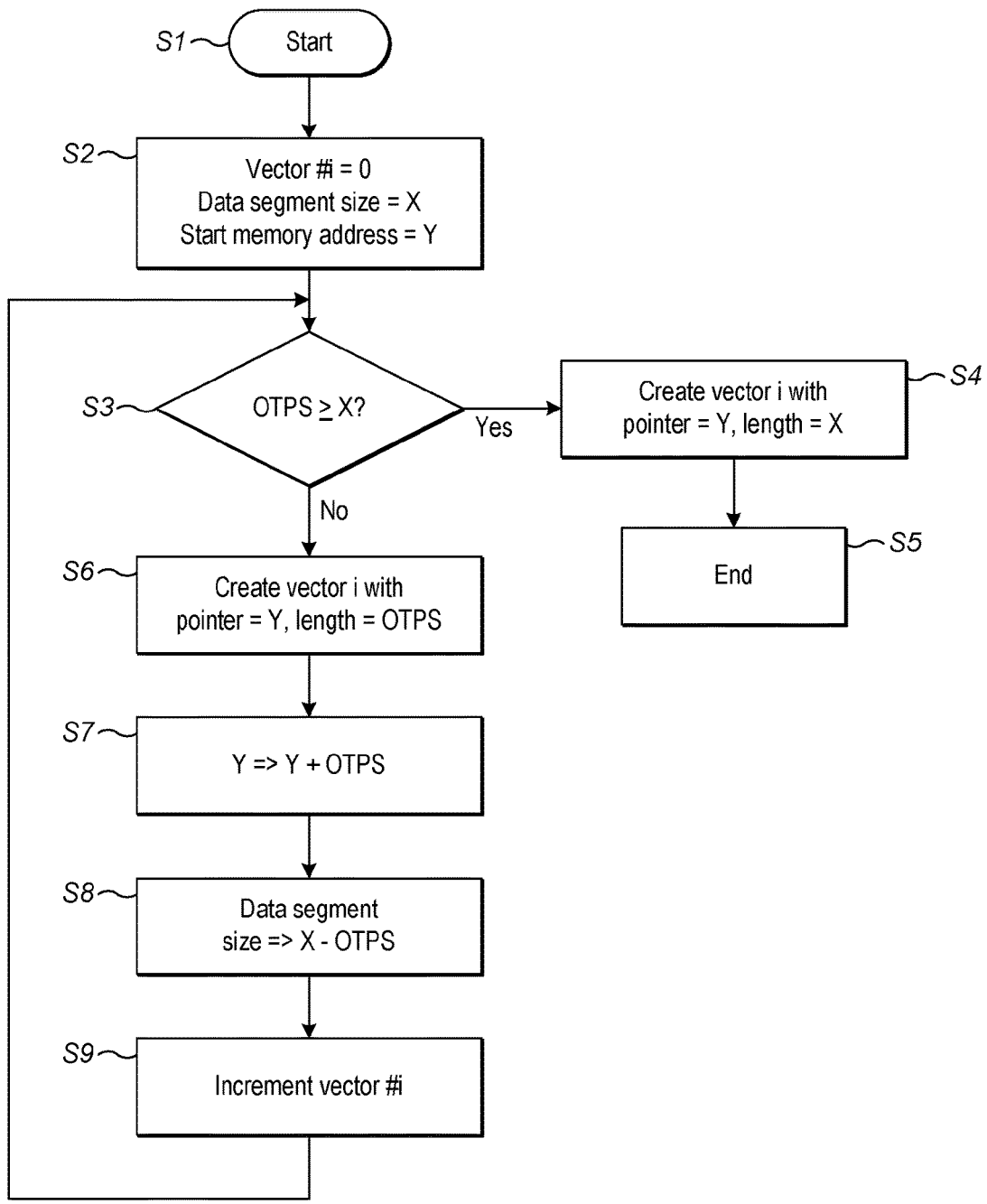
FIG. 9 is a flowchart illustrating a method of operating a dispatcher forming part of the system of FIG. 1 or FIG. 3.

Operation of the dispatcher 704 in converting the buffer IO vector array 101 to the transfer packet IO vector array 102 will now be described with reference to FIG. 9.

Operation starts at step S1. At step S2, a vector #i parameter is initialised at zero. Also, the size of the data segment is set as the value of a variable X. Additionally, the starting memory address of the data segment in the buffer is set as the value of a variable Y.

The data segment then begins to be processed at step S3. The value of the OPTS parameter for the path 702, 703 (this is the path selected at step S4 of FIG. 7) has already been fetched, in particular by action of step S5 of FIG. 7. At step S3, it is determined whether or not the value of the data segment size X is less than or equal to the value of the fetched OTPS parameter. If the data segment size X is less than or equal to the value of the OTPS parameter, this indicates that all of the data segment can fit into one transfer packet. Upon this determination, at step S4 an IO vector is created. The vector is created with a start memory address (pointer) having a value equal to the value of the parameter Y. The vector has a length field including a length parameter that is equal to the value of X, which indicates the size of the data segment. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer. Following the creation of the IO vector i and the provision of the IO vector to the FIFO buffer in step S4, the operation ends at step S5.

If at step S3 it is determined that the data segment size X is greater than the value of the OTPS parameter, the operation proceeds to step S6. Here, the dispatcher 704 creates an IO vector i. Here, the IO vector i is provided with a start memory address (pointer) having a value equal to the parameter Y. The length of the vector i is equal to the value of the OTPS parameter. As such, step S6 involves creating an IO vector that points to data of a length equal to the optimal transfer packet size and having a start address at the start of data that has not yet been processed. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer.

Following step S7, the value of the start memory address parameter Y is increased by the value of the OTPS parameter. This moves the start memory address on such as to point to data starting just after the data indicated by the IO vector i that was created in step S6.

Following step S7, at step S8 the value of the data segment size parameter X is reduced by the value of the OTPS parameter. This causes the value of the buffer size parameter X to be equal to the amount of the segment data that remains to be indicated by a transfer packet IO vector in the IO vector array 102.

Following step S8, at step S9 the vector #i value is incremented. As such, when a vector is subsequently created at step S6 or step S4, it relates to a higher vector number.

It will be appreciated that the check at step S3 results in the loop formed by steps S6 to S9 being performed until the amount of data remaining in the buffer is less than or equal to the value of the OTPS parameter, at which time the remaining data is provided into a final IO vector i at step S4.

Figure 7:
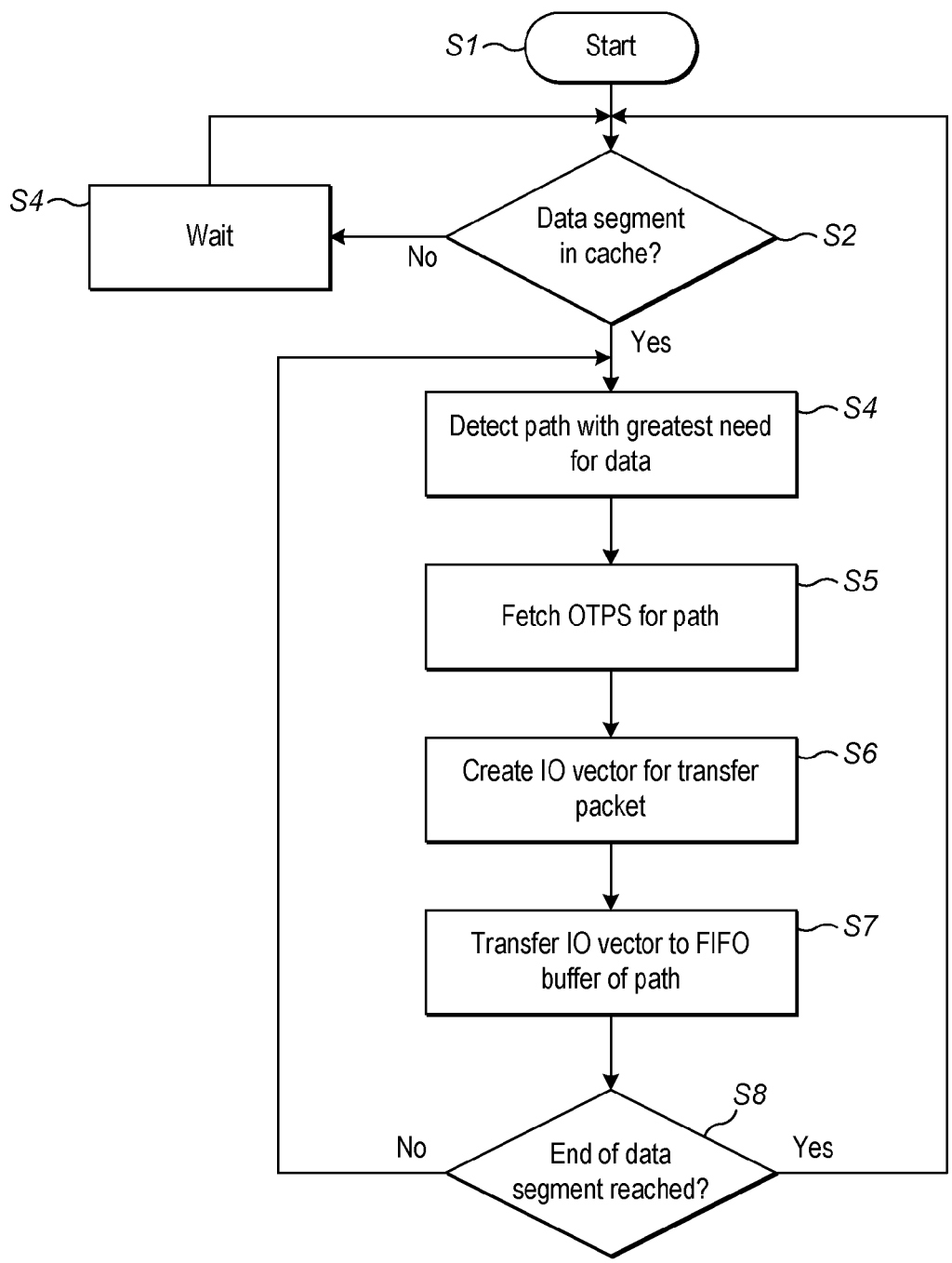
FIG. 7 is a flowchart illustrating a method of grouping input packets into transfer packets according to embodiments of the specification.

The IO vectors created at steps S4 and S6 for different parts of the same data segment may be created for different ones of the paths 702, 703, according to the determinations made at step S4 of FIG. 7. Also, the lengths of the resulting transfer packets may differ, because they are dependent on the values of the OPTS parameter(s) at the time of fetching the OPTS parameter for the path(s) 702, 703 at step S5 of FIG. 7 as well as because the last part of a data segment will normally be shorter that the value of the OTPS parameter. As such, the transfer packets of the resulting IO vector array may have a number of different lengths.

The resulting transfer packet IO vector array 102 is then provided to the FIFO buffer(s) of the relevant transmit interface(s) 707, 711 of the relevant path(s) 702, 703. Depending on the determinations as to which path 702, 703 had the greatest need for data at step S4 of FIG. 7, different ones of the IO vectors in the transmit packet IO vector array may be included in different FIFO buffers in different transmit interfaces 707, 711. The transmit interface(s) 707, 711 then use the IO vectors in their respective FIFO buffer to retrieve the parts of the data segment (the transfer packets) from the data buffer 704 and transmit them over the logical connections that are provided by the respective path 702, 703.

When the transmit interface 707, 711 is ready to transmit data on the next logical connection, the transmit interface 707, 711 looks to the next IO vector in its FIFO buffer. From this IO vector, it extracts the memory address of the data buffer 704 where the data to be transmitted begins and extracts the related transfer packet length. The transmit interface 707, 711 then extracts the corresponding data from the data buffer 704 and transmits it over the next logical connection on its path 702, 703. Once the transmit interface 707, 711 receives an acknowledgement for that transfer packet, this is notified to the dispatcher 704 so that the corresponding memory in the data buffer can be reallocated.

The conversion of the IO vector arrays described with reference to FIGS. 8 and 9 results in the sending of at least some transfer packets having a desired length (equal to the value of the OTPS parameter) without requiring the unnecessary copying of data. This is achieved because the IO vectors in the transfer packet IO vector array 102 include address and length information that directly relates to the transfer packets. Thus, the number of memory read and write operations is minimised, whilst at the same time allowing high flexibility in the receiving of input data into the local bridge 3 and the sending of transfer packets of a desired length to the remote bridge 4. Of course, some transfer packets are created with a length that is less than the value of the OTPS parameter. Once a path 702, 703 has been determined at step S4, the dispatcher 704 begins preparing to provide the transmit interface 707, 711 for the path 702, 703 with data from the data cache 706. This starts at step S5, where the value of the OTPS parameter for the path 702, 703 is fetched. The value of the parameter is fetched from the corresponding path's AI transmitter module 709, 713. The value of the OTPS parameter is calculated by the AI transmitter module 709, 713 in the manner described below with reference to FIG. 11 Since the value of the OTPS parameter is calculated separately for each of the paths 702, 703, there may be a different OTPS parameter for each of the paths 702, 703.

At step S6, the dispatcher 704 selects a first part of the next data segment in the cache 706. The part of the data segment that is selected has a length equal to the fetched value of the OPTS parameter. Where the data segment has a length that is less than or equal to the value of the OPTS parameter, the whole of the data segment is selected. Where the data segment has a length that is greater than the value of the OPTS parameter, a part of the data segment of length equal to the value of the OPTS parameter is selected.

Once a quantity of data from the dispatcher 704 has been selected for provision to the path, an IO vector for the selected data is created by the dispatcher 704, for use by the transmit interface 707, 711 of the selected path. The creation of the IO vector constitutes the provision of a transfer packet. The creation of the IO vector and thus the transfer packet is described in more detail below with reference to FIGS. 8, 9 and 10. Briefly, the conversion of the IO vector results in an IO vector that points to a transfer packet having at maximum the same size as the size indicated by the OTPS parameter for the path which was fetched at step S5. The IO vector is later provided to the FIFO buffer (not shown) associated with the relevant path 702, 703.

After the IO vector creation at step S6, the IO vector is transferred to the selected path 702, 703, and in particular to a FIFO buffer (not shown) of the transmit interface 707, 711 of that path, at step S7. The result of step S7 is the provision, to the FIFO buffer (not shown) forming part of the transmit interface 707, 711 of the path that was detected at step S4 to have the greatest need for data, of an IO vector comprising a pointer to a transfer packet and indicating the length of the transfer packet. Moreover, the FIFO buffer of the path 702, 703 is provided with an IO vector that relates to a transfer packet having the optimum transfer packet size, or possibly a smaller size. This allows the path 702, 703, and in particular the relevant transmit interface 707, 711, to access the (whole or part of) the data segment. This is provided with the (whole or part of the) data segment in a transfer packet having at maximum the optimum transfer packet size that has been determined for the selected path, for transmission over a logical connection of the selected path 702, 703.

At step S8, it is determined whether the end of the data segment has been reached. On a positive determination, the operation returns to steps S2, where the next data segment can be retrieved and processed. On a negative determination, the operation returns to step S4. Here, the steps S4 to S7 are performed again for the next part of the data segment.

If step S4 identifies that the same path 702, 703 still has the greatest need for data, an IO vector (and transfer packet) is created for the next part of the segment with a length equal to (or possibly less than) the value of the OTPS value for that path 702, 703. The value of OTPS does not normally change between successive transfer packets for the same path 702, 703, although this does occur occasionally.

If step S4 identifies that the opposite path 702, 703 now has the greatest need for data, an IO vector (and transfer packet) is created for the next part of the segment with a length equal to (or possibly less than) the value of the OTPS value for that opposite path 702, 703. The size of this next transfer packet is dependent on the value of a different OPTS parameter (the OPTS parameter for the opposite path) so often is different to the size of the previous transfer packet.

For a data segment that is longer than the value of the OPTS parameter that is fetched at step S5 when the data segment is first processed, the transmission of the data segment may occur over two different paths 702, 703. It is not that the data segment is transmitted over both paths. Instead, different parts of the data segment are transmitted over different paths 702, 703.

The operation of the dispatcher 704 in converting the buffer IO vector array 101 to the transfer packet IO vector array 102 will now be described with reference to FIG. 9.

Operation starts at step S1. At step S2, a vector #i parameter is initialised at zero. Also, the size of the data segment is set as the value of a variable X. Additionally, the starting memory address of the data segment in the buffer is set as the value of a variable Y.

The data segment then begins to be processed at step S3. The value of the OPTS parameter for the path 702, 703 (this is the path selected at step S4 of FIG. 7) has already been fetched, in particular by action of step S5 of FIG. 7. At step S3, it is determined whether or not the value of the data segment size X is less than or equal to the value of the fetched OTPS parameter. If the data segment size X is less than or equal to the value of the OTPS parameter, this indicates that all of the data segment can fit into one transfer packet. Upon this determination, at step S4 an IO vector is created. The vector is created with a start memory address (pointer) having a value equal to the value of the parameter Y. The vector has a length field including a length parameter that is equal to the value of X, which indicates the size of the data segment. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer. Following the creation of the IO vector i and the provision of the IO vector to the FIFO buffer in step S4, the operation ends at step S5.

If at step S3 it is determined that the data segment size X is greater than the value of the OTPS parameter, the operation proceeds to step S6. Here, the dispatcher 704 creates an IO vector i. Here, the IO vector i is provided with a start memory address (pointer) having a value equal to the parameter Y. The length of the vector i is equal to the value of the OTPS parameter. As such, step S6 involves creating an IO vector that points to data of a length equal to the optimal transfer packet size and having a start address at the start of data that has not yet been processed. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer.

Following step S7, the value of the start memory address parameter Y is increased by the value of the OTPS parameter. This moves the start memory address on such as to point to data starting just after the data indicated by the IO vector i that was created in step S6.

Following step S7, at step S8 the value of the data segment size parameter X is reduced by the value of the OTPS parameter. This causes the value of the buffer size parameter X to be equal to the amount of the segment data that remains to be indicated by a transfer packet IO vector in the IO vector array 102.

Following step S8, at step S9 the vector #i value is incremented. As such, when a vector is subsequently created at step S6 or step S4, it relates to a higher vector number.

It will be appreciated that the check at step S3 results in the loop formed by steps S6 to S9 being performed until the amount of data remaining in the buffer is less than or equal to the value of the OTPS parameter, at which time the remaining data is provided into a final IO vector i at step S4.

The IO vectors created at steps S4 and S6 for different parts of the same data segment may be created for different ones of the paths 702, 703, according to the determinations made at step S4 of FIG. 7. Also, the lengths of the resulting transfer packets may differ, because they are dependent on the values of the OPTS parameter(s) at the time of fetching the OPTS parameter for the path(s) 702, 703 at step S5 of FIG. 7 as well as because the last part of a data segment will normally be shorter that the value of the OTPS parameter. As such, the transfer packets of the resulting IO vector array may have a number of different lengths.

The resulting transfer packet IO vector array 102 is then provided to the FIFO buffer(s) of the relevant transmit interface(s) 707, 711 of the relevant path(s) 702, 703. Depending on the determinations as to which path 702, 703 had the greatest need for data at step S4 of FIG. 7, different ones of the IO vectors in the transmit packet IO vector array may be included in different FIFO buffers in different transmit interfaces 707, 711. The transmit interface(s) 707, 711 then use the IO vectors in their respective FIFO buffer to retrieve the parts of the data segment (the transfer packets) from the data buffer 704 and transmit them over the logical connections that are provided by the respective path 702, 703.

When the transmit interface 707, 711 is ready to transmit data on the next logical connection, the transmit interface 707, 711 looks to the next IO vector in its FIFO buffer. From this IO vector, it extracts the memory address of the data buffer 704 where the data to be transmitted begins and extracts the related transfer packet length. The transmit interface 707, 711 then extracts the corresponding data from the data buffer 704 and transmits it over the next logical connection on its path 702, 703. Once the transmit interface 707, 711 receives an acknowledgement for that transfer packet, this is notified to the dispatcher 704 so that the corresponding memory in the data buffer can be reallocated.

The conversion of the IO vector arrays described with reference to FIGS. 8 and 9 results in the sending of at least some transfer packets having a desired length (equal to the value of the NTS parameter) without requiring the unnecessary copying of data. This is achieved because the IO vectors in the transfer packet IO vector array 102 include address and length information that directly relates to the transfer packets. Thus, the number of memory read and write operations is minimised, whilst at the same time allowing high flexibility in the receiving of input data into the local bridge 3 and the sending of transfer packets of a desired length to the remote bridge 4. Of course, some transfer packets are created with a length that is less than the value of the NTS parameter.

To optimise the flow of data across the paths 702, 703, the IO vector size for each transmit interface should equal the number of active logical connections multiplied by the RWS of each active logical connect. Any IO vector size larger than this would require a number of logical connections to be used more than once before the IO vector could be released and another one loaded. This would leave active logical connections without data to transmit and thus would result in inefficiency and a loss of performance as there would be a delay before loading the new IO vector data. In a similar manner, a IO vector size that is too small would have a similar but lesser effect.

Those persons familiar with the workings of TCP/IP protocol will understand that each of the multiple logical connections 12-1~12-n that is used simultaneously to transfer data between bridges 3, 4 could have a different value for the RWS parameter from another and this may change as the data transfers progress over time. The value of the RWS parameter for a logical connection is determined by the receiver 4 based on packet loss, system limitations including available memory, a ramp up size setting and a maximum RWS size setting. In addition, depending on the network conditions detected by the AI modules 707, 711, the number of logical connection may also vary in a response to changes in latency or any other network event.

Although in the above two paths 702, 703 are used for the transmission of data, in other embodiments there are further paths. In these embodiments, each path has a respective transmit interface, a receive interface, a transmit interface, a transmit AI module and a receive AI module.

The plural logical connections may be TCP/IP connections or they may be logical connections according to some other protocol, whether standardized or proprietary. Monitoring acknowledgements received in respect of the data packets transmitted over the logical connections may be performed by an artificial intelligence module or by a controller of some other sort. Reusing a logical connection for which an acknowledgement for a transmitted data packet has been received involves transmitting a further data packet after the acknowledgement has been received. The logical connection on which the further data packet is transmitted may be the logical connection for which a most recently transmitted data packet has been received, or it may be the only available logical connection, or it may be the logical connection that has been available for the longest time period. A new logical connection may be created in any suitable way, and a data packet may be transmitted over the path on the newly created logical connection straight away, in response to the creation being completed. Excess logical connections may be destroyed in any suitable way.

Except where two or more paths are required, the features that are described above in relation to the FIG. 3 embodiments apply also to the FIG. 1 embodiment. This applies to all features.

The dispatcher 704, the first AI module 709 and the first transmit interface 707 described above are in some embodiments used without the second AI module and the second transmit interface. In these embodiments, only one path 5, 702 is present. However, plural logical connections are used and transfer packets, and network payload packets, are created such as to provide optimised transfer of data over the path 5, 702.

The data that forms the data in at the transmitter can take any suitable form. For instance, it may be backup data for recording on a tape or on disk. It may be remote replication data. It may be restore data, being used to restore data from a location where it had been lost. It may alternatively be file-based data from a file transmission protocol (FTP) sender. It may alternatively be stream from a camera, for instance an HTTP camstream. It may alternatively be simple object storage data. This is a non-exhaustive list.

Although the embodiments described above relate to a SAN, the apparatus and method can be used in other applications where data is transferred from one node to another. The apparatus and method can also be implemented in systems that use a protocol in which ACK messages are used to indicate successful data reception other than TCP/IP, such as those using Fibre Channel over Ethernet (FCOE), Internet Small Computer Systems Interface (iSCSI) or Network Attached Storage (NAS) technologies, standard Ethernet traffic or hybrid systems.

In addition, while the above described embodiments relate to systems in which data is acknowledged using ACK messages, the methods may be used in systems based on negative acknowledgement (NACK) messages. For instance, in FIG. 3, step S3.12, the processor 10 of the bridge 3 determines whether an ACK message has been received. In a NACK-based embodiment, the processor 10 may instead be arranged to determine whether a NACK message has been received during a predetermined period of time and, if not, to continue to data transfer using port i.

The invention claimed is:

1. Apparatus, the apparatus having at least one processor and at least one memory having computer-readable code stored therein which when executed controls the at least one processor to perform a method comprising:
   maintaining plural logical connections on a communications path;
   transmitting data packets on different ones of the logical connections;
   monitoring acknowledgements received in respect of the data packets transmitted over the different ones of the logical connections;
   reusing a logical connection for which an acknowledgement for a transmitted data packet has been received;
   creating a new logical connection when there is a data packet to transmit over the path and there are no logical connections available for reuse; and
   in response to receiving an acknowledgment, destroying one or more excess logical connections by, for each excess logical connection:
      verifying to ensure that no data transmissions are in progress,
      verifying that no acknowledgements are outstanding, subsequent to the verifying steps, sending a logical connection close message between a first bridge and a second remote bridge, and receiving at the first bridge an acknowledgement message from the second bridge acknowledging the logical connection close message, wherein the logical connection close message indicates that there is no more data to be transmitted.

2. Apparatus as claimed in claim 1, wherein the code when executed controls the at least one processor to perform identifying excess logical connections by determining that there are plural connections available for reuse.

3. Apparatus as claimed in claim 1, wherein the code when executed controls the at least one processor to perform destroying some but not all excess logical connections in one operation.

4. Apparatus as claimed in claim 3, wherein the code when executed controls the at least one processor to perform destroying only a single excess logical connection and refraining from destroying other excess logical connections.

5. Apparatus as claimed in claim 3, wherein the code when executed controls the at least one processor to perform destroying only a single excess logical connection and refraining from destroying other excess logical connections.

6. Apparatus as claimed in claim 1, wherein the code when executed controls the at least one processor to perform destroying all excess logical connections in one operation.

7. Apparatus as claimed in claim 1, wherein there is a plural-to-one relationship between the plural logical connections and a port.

8. Apparatus as claimed in claim 1, wherein the code when executed controls the at least one processor to perform creating the new logical connection by establishing a Transmission Control Protocol (TCP) Stream socket between first and second devices.

9. Apparatus as claimed in claim 1, wherein a value of a Receive Window Size parameter for a logical connection is independent of values for the parameter on other ones of the logical connections.

10. Apparatus, the apparatus having at least one processor and at least one memory having computer-readable code stored therein which when executed controls the at least one processor to perform a method comprising:

maintaining plural logical connections on a communications path;

transmitting data packets on different ones of the logical connections;

monitoring acknowledgements received in respect of the data packets transmitted over the different ones of the logical connections;

reusing a logical connection for which an acknowledgement for a transmitted data packet has been received;

creating a new logical connection when there is a data packet to transmit over the path and there are no logical connections available for reuse; and destroying excess logical connections, wherein the code when executed controls the at least one processor also to perform:

initializing a value of a first parameter, x, which indicates a count of network payload packets;

initializing a value of a second parameter, n, which indicates a count of acknowledgements that have been received;

moving data to a transmit buffer ready for transmission;

determining whether a logical connection is available by determining whether any logical connections have no outstanding acknowledgement;

in response to a determination that no logical connections are available, creating a new logical connection by establishing a socket between a first bridge and a second bridge;

in response to a determination that a logical connection is available, transmitting a network transfer packet identified by the value of the second parameter, n;

incrementing the value of the second parameter, n;

determining whether the data moved to the transmit buffer constitutes the end of data to be transmitted, and, on a negative determination: determining whether an acknowledgement for a network transfer packet identified by the value of the first parameter, x, has been received from the second bridge;

in response to a determination that an acknowledgment for said network transfer packet identified by the value of the first parameter, x, has not been received, determining whether a timeout has expired; and if the timeout has expired, retransmitting the network transfer packet identified by the value of the first parameter, x, from the buffer.

11. Apparatus as claimed in claim 10, wherein the code when executed controls the at least one processor to perform identifying excess logical connections by determining that there are plural connections available for reuse.

12. Apparatus as claimed in claim 10, wherein the code when executed controls the at least one processor to perform destroying excess logical connections in response to receiving an acknowledgement.

13. Apparatus as claimed in claim 10, wherein the code when executed controls the at least one processor to perform destroying some but not all excess logical connections in one operation.

14. Apparatus as claimed in claim 10, wherein the code when executed controls the at least one processor to perform destroying all excess logical connections in one operation.

15. Apparatus as claimed in claim 10, wherein the code when executed controls the at least one processor to perform destroying a logical connection by sending a message to a remote device indicating that there is no more data to be transmitted.

16. Apparatus as claimed in claim 10, wherein there is a plural-to-one relationship between the plural logical connections and a port.

17. Apparatus as claimed in claim 10, wherein the code when executed controls the at least one processor to perform creating a new logical connection by establishing a Transmission Control Protocol (TCP) Stream socket between first and second devices.

18. Apparatus as claimed in claim 10, wherein a value of a Receive Window Size parameter for a logical connection is independent of values for the parameter on other ones of the logical connections.

* * * * *